United States Patent
Wu

(10) Patent No.: US 9,971,350 B2
(45) Date of Patent: May 15, 2018

(54) REAL-TIME NAVIGATING METHOD FOR MOBILE ROBOT

(71) Applicant: KINPO ELECTRONICS, INC., New Taipei (TW)

(72) Inventor: Sheng-Hui Wu, New Taipei (TW)

(73) Assignee: KINPO ELECTRONICS, INC., New Taipei (TW)

(*) Notice: Subject to any disclaimer, the term of this patent is extended or adjusted under 35 U.S.C. 154(b) by 84 days.

(21) Appl. No.: 15/340,897

(22) Filed: Nov. 1, 2016

(65) Prior Publication Data

US 2018/0052466 A1 Feb. 22, 2018

(30) Foreign Application Priority Data

Aug. 22, 2016 (TW) ............................. 105126812 A

(51) Int. Cl.
| | |
|---|---|
| *G05D 1/02* | (2006.01) |
| *G01S 17/93* | (2006.01) |
| *B25J 19/06* | (2006.01) |

(52) U.S. Cl.
CPC ............ *G05D 1/0214* (2013.01); *B25J 19/06* (2013.01); *G01S 17/936* (2013.01); *G05D 1/0231* (2013.01)

(58) Field of Classification Search
CPC ..... G05D 1/0214; G05D 1/0231; B25J 19/06; G01S 17/936
See application file for complete search history.

(56) References Cited

U.S. PATENT DOCUMENTS

| | | | | |
|---|---|---|---|---|
| 5,279,672 A | * | 1/1994 | Betker | .................. A47L 11/305 |
| | | | | 134/18 |
| 2009/0043439 A1 | * | 2/2009 | Barfoot | ..................... G08G 1/20 |
| | | | | 701/25 |
| 2011/0222732 A1 | * | 9/2011 | Higuchi | ................ B60W 30/14 |
| | | | | 382/104 |

FOREIGN PATENT DOCUMENTS

| | | |
|---|---|---|
| CN | 102445694 A | 5/2012 |
| CN | 102914967 B | 1/2015 |
| CN | 104423384 A | 3/2015 |
| CN | 104967672 A | 10/2015 |
| CN | 105607635 A | 5/2016 |
| TW | 200951887 A | 12/2009 |
| TW | M508319 U | 9/2015 |

* cited by examiner

OTHER PUBLICATIONS

Office Action dated Jan. 19, 2017 of the corresponding Taiwan patent application.

*Primary Examiner* — Richard M Camby
(74) *Attorney, Agent, or Firm* — Chun-Ming Shih; HDLS IPR SERVICES

(57) ABSTRACT

A real-time navigating method for mobile robot is provided. The method comprises the following steps of: retrieving a target position at a mobile robot; receiving a position signal from an external beacon device by an ultra-wideband communication module and calculating a current position of the mobile robot; calculating a moving direction according to the target position and the current position; calibrating the moving direction when detecting any obstacle by a laser range sensing module and moving towards the calibrated moving direction for dodging the obstacle; and, repeatedly executing above detection, calibration and movement until arriving the target position. The present disclosed example can effectively prevent the mobile robot from straying into the region without the positioning signal and failure in navigation via detecting the obstacle actively.

10 Claims, 9 Drawing Sheets

REAL-TIME NAVIGATING METHOD FOR MOBILE ROBOT

BACKGROUND OF THE INVENTION

Field of the Invention

The technical field relates to mobile robot and more particularly related to a real-time navigating method for mobile robot.

Description of Related Art

Different from the outdoor positioning technology using Global Positioning System (GPS), because the GPS signal in the indoor space (such as in a building) is poor and can't be received accurately, the same outdoor positioning technology is not suitable for indoor positioning.

For solving above-mentioned problem, an indoor positioning technology had been provided. Above-mentioned indoor positioning technology uses a plurality of the positioning beacons to send a plurality of the different positioning signals. More specifically, the positioning beacons are Ultra-Wideband (UWB) signal emitters, respectively installed at the different positions of the building, and respectively configured to transfer a UWB positioning signal corresponding to the installed position. Thus, a user can use an indoor navigating device to receive the positioning signals from the positioning beacons for indoor positioning.

Moreover, a mobile robot having ability of automatic indoor positioning had also been provided. After receiving a target position, above-mentioned mobile robot can plan a navigation route according to above-mentioned positioning signals, and automatically move to the target position according to the planned navigation route.

Although above-mentioned mobile robot can move to the target position automatically, however, because of a limitation of the UWB communication, there may be an error between a position determined by above-mentioned positioning signals and an actual position. Above-mentioned error will make the mobile robot plan the incorrect navigation route such that the mobile robot fails to move to the target position accurately or strays into a prohibited region, such as a restricted region or a region without any positioning signal.

FIG. 1 is a schematic view of automatically navigating of a mobile robot of the related art for exemplifying above-mentioned situation. As shown in FIG. 1, a coordinate of the target position 10 is $(X_t, Y_t)$, the mobile robot 12 locates at a main aisle between a plurality of the shelfs 140-148, and an actual coordinate of the mobile robot 12 is $(X_1, Y_1)$. Thus, the mobile robot 12 can arrive at the target position $(X_t, Y_t)$ successfully if moving towards a moving direction V1.

Because there is the error between those positioning signals, the mobile robot may misidentify its coordinate as $(X_2, Y_2)$, and plan the incorrect moving direction $V_2$. After moving towards the incorrect moving direction $V_2$, the mobile robot 12 will move from the actual coordinate $(X_1, Y_1)$ to the incorrect position corresponding to the coordinate $(X_3, Y_3)$.

When the mobile robot locates at the incorrect position, because the positioning signals are shielded by the shelfs 146,148, the mobile robot is unable to re-plan the new navigation route caused by failing to receive the positioning signals. Therefore, the mobile robot 12 is unable to break away from the shelfs 146,148 and fails in navigation.

SUMMARY OF THE INVENTION

The present disclosed example is directed to a real-time navigating method for mobile robot which has ability of detecting an obstacle proactively and real-time calibrating a moving direction.

One of the exemplary embodiments, a real-time navigating method for mobile robot, comprises:
  a) retrieving a target position at a mobile robot;
  b) determining a current position of the mobile robot according to a position signal received by an ultra-wideband communication module;
  c) calculating a moving direction according to the target position and the current position;
  d) calibrating the moving direction when detecting any obstacle by a laser range sensing module, and controlling the mobile robot to move towards the calibrated moving direction; and
  e) repeatedly executing the step b to the step d until the mobile robot arrives the target position.

The present disclosed example can effectively prevent the mobile robot from straying into the region without the positioning signal and failure in navigating to the target position via detecting the obstacle actively.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with the attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1:
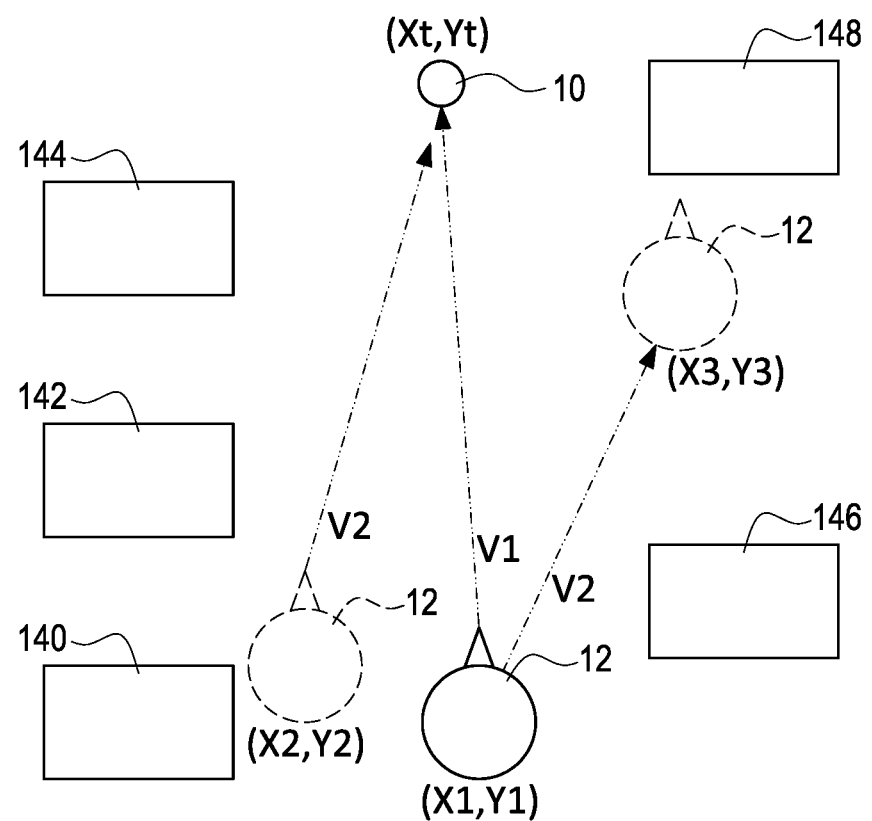
FIG. 1 is a schematic view of automatically navigating of a mobile robot of the related art.
Figure 2:
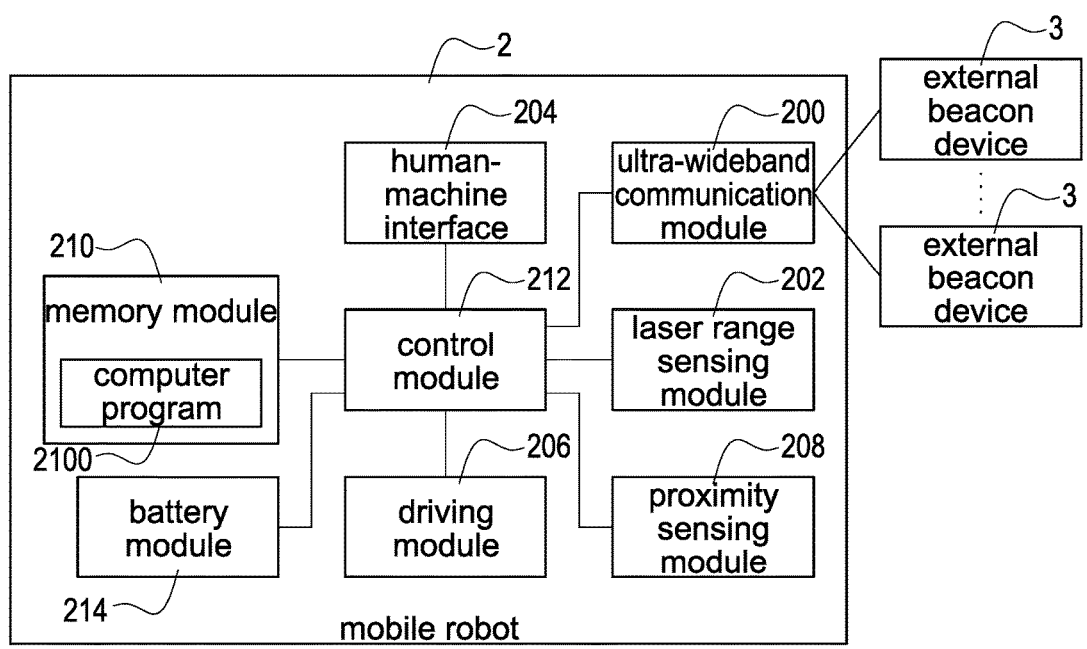
FIG. 2 is an architecture diagram of a mobile robot according to a first embodiment of the present disclosed example.

First, please refer to FIG. 2, which illustrates an architecture diagram of a mobile robot according to a first embodiment of the present disclosed example. The present disclosed example discloses a real-time navigating method for mobile robot (hereinafter the real-time navigating method) applied to a mobile robot 2 shown in FIG. 2. In the present disclosed example, the mobile robot 2 comprises an ultra-wideband (UWB) communication module 200, a laser range sensing module 202, a human-machine interface 204, a driving module 206, a proximity sensing module 208, a memory module 210 and a control module 212 electrically connected to above-mentioned elements.

The ultra-wideband communication module 200 is used to transfer and receive an ultra-wideband signal, such as 6.5 GHz radio frequency (RF) signal. Preferably, the ultra-wideband communication module 200 is an ultrasonic transceiver, and can receive the positioning signal transferred as ultrasound signal from a plurality of the external beacon devices 3.

More specifically, the external beacon devices 3 are installed at the difference positions of a specific region (such as a building) respectively, and configured to transfer the different positioning signals respectively. Preferably, a user can code the specific region into a coordinate system for making the position of each external beacon device 3 corresponded to a virtual coordinate. Then, the user can configure the external beacon devices 3 respectively for make each positioning signal transferred by each external beacon device 3 comprise the coded coordinate corresponding to each external beacon device 3.

The laser range sensing module 202 is used to detect the obstacle(s). More specifically, the laser range sensing module 202 can determine whether there is any obstacle in a scan range of the laser range sensing module 202 according to whether a reflected light is received. Furthermore, the laser range sensing module 202 can further calculate a distance between the mobile robot and the detected obstacle according to a time difference between the time of emitting the laser light and the time of receiving the reflected laser light.

Preferably, the laser range sensing module 202 comprises a laser module used to emit the laser light and a prism module (not shown in the figures). The user can adjust the dimension of the laser range sensing module 202 scanning via controlling a rotation mode of the plurality of the prisms of the prism module.

For example, when the laser range sensing module 202 controls all the prisms to rotate horizontally or vertically, the laser range sensing module 202 can transform the point laser light into the visual 2-dimensional laser light, and execute a plane scan to the external environment. When the laser range sensing module 202 controls a part of the prisms to rotate horizontally and the other part of the prisms to rotate vertically, the laser range sensing module 202 can transform the point laser light into the visual 3-dimensional laser light, and execute a stereoscopic scan to the external environment.

Preferably, the user can adjust the scan range of the laser range sensing module 202 via adjusting a coverage range (namely the opaque range) of a case (not shown in the figures) of the mobile robot 2.

Taking the maximum scan range of the laser range sensing module 202 is 360 degrees for example, when the coverage range of the case is 240 degrees (in other words, the translucent/colorless range is only 120 degrees), the scan range of the laser range sensing module 202 will be adjusted into 120 degrees.

Preferably, the user can adjust a scan accuracy of the laser range sensing module 202 via adjusting a sampling angle of the laser range sensing module 202. More specifically, the laser range sensing module 202 comprises an angle encoder (not shown in the figures). The user can adjust the scan accuracy via configuring the sampling angle (such as sampling per 5 degrees or sampling per 10 degrees) of the angle encoder.

The human-machine interface 204, such as keyboard, touchscreen, display, speaker or any combination of above-mentioned device, is used to receive input or output information. The driving module is used to control the mobile robot 2 to move.

The proximity sensing module 208, such as proximity sensor or light sensor, is used to detect the obstacle very close (for example, the distance between the mobile robot 2 and the obstacle is less than 1 meter) to the mobile robot 2. The memory module is used to store data.

Please be noted that the scan range of the laser range sensing module 202 is significantly less than the transferring range of the proximity sensing module 208, and is significantly large than the sensing range of the proximity sensing module 208.

The control module 212 is used to control the mobile robot 2. Preferably, the control module 212 can control the mobile robot 2 to automatically navigate to the target position (described later).

Preferably, the control module 212 can further interact with the user via the human-machine interface 204 for providing service or information.

Taking the service of guiding user to a display position of a commodity for example, after the user selects the specific commodity via the human-machine interface 204, the control module 212 can automatically retrieve the display position of the selected specific commodity, and make the retrieved display position as the target position. Then, the control module 212 controls the mobile robot 2 to automatically navigate to the target position. Moreover, during navigation, the control module 212 plays the related introductory information (such as the information of store or the specific commodity) via the human-machine interface 204. Thus, the mobile robot 2 can replace the clerk of the store and guide the user to the display position of the specific commodity.

Taking online customer service for example, the user can operate the human-machine interface 204 of the mobile robot 2 to get contact with a remote customer service locate for getting the required information.

Preferably, the mobile robot 2 further comprises a battery module 214. The battery module 214 is electrically connected to the control module 212 and used to provide the power required by the mobile robot 2 for operation. The memory module 210 can further store a charging position (such as a coordinate of a charging base). When detecting that a remaining power of the battery module 214 is too low, the control module 2 can retrieve the charging position from the memory module 210 and make the retrieved charging position as the target position, and control the mobile robot 2 to automatically navigate to the target position for automatically charging. Moreover, during charging, the mobile robot 2 can still provide a part of the services (such as commodity-searching service or online customer service).

Thus, the present disclosed example can effectively prevent the mobile robot 2 from stopping providing services because of power shortage.

Please note that the real-time navigating method of each embodiment of the present disclosed example may be implemented by hardware such as semiconductor technology, electronic circuit technology or digital circuit technology, implemented by software, e.g. firmware or application program, but are not limited to aforementioned examples, or implemented by the combination of the hardware and the software.

Preferably, the memory module 210 can further store a computer program 2100. The computer program 2100 comprises a plurality of the computer-implementable codes. After the control module 212 executes the computer program 2100, the control module 212 can control the mobile robot 2 to perform the steps of the real-time navigating method of each embodiment of the present disclosed example.

Figure 3:
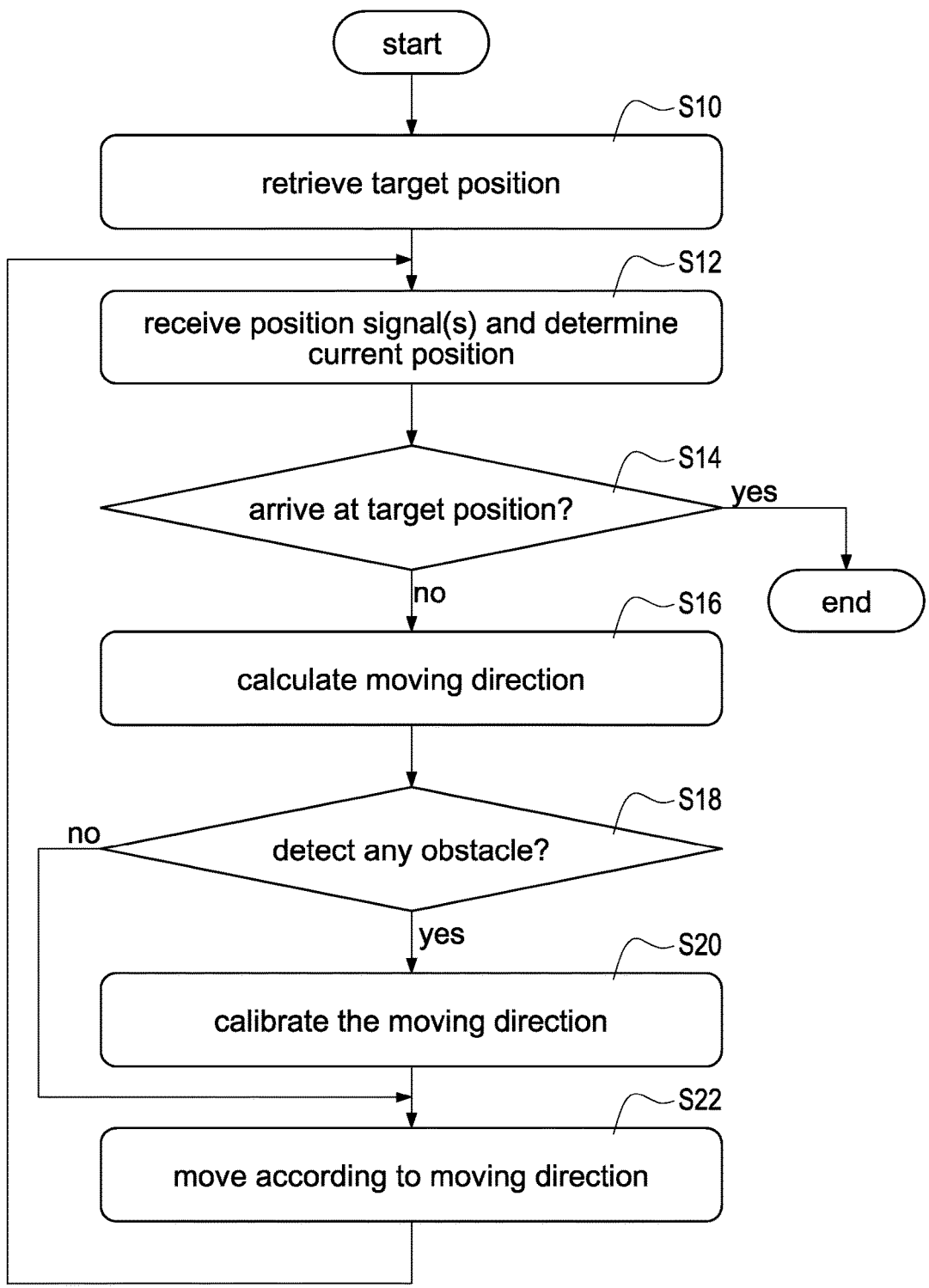
FIG. 3 is a flowchart of a real-time navigating method for mobile robot according to a first embodiment of the present disclosed example.

Please refer to FIG. 3, which illustrates a flowchart of a real-time navigating method for mobile robot according to a first embodiment of the present disclosed example. The real-time navigating method of this embodiment comprises the following steps.

Step S10: the control module 212 retrieves the target position. Preferably, the control module 212 can receive the user operation via the human-machine interface 204 for configuring the target position, or receive the target position from an external user electronic device via a network, such as Wi-Fi network or Bluetooth network.

Step S12: the control module 212 receives the position signal(s) via the UWB communication module 200, and determines the current position according to the received position signal(s). Preferably, the control module 212 respectively receives three or more positioning signals from three or more external beacon device 3, and determines the current position by using the three-point positioning method (such as calculating the coordinate of the current position) according to the received three or more positioning signals.

Step S14: the control module 212 determines whether the mobile robot 2 arrives at target position. Preferably, the control module 212 determines that the mobile robot 2 arrives at target position when the current position is consistent with the target position.

If the control module 212 determines that the mobile robot 2 doesn't arrive at target position, performs a step S16. Otherwise, the control module 212 terminates the real-time navigating method.

Step S16: the control module 212 determines the moving direction according to the current position and the target position. Preferably, the control module 212 calculates an azimuth angle between the current position and the target position, and makes the calculated azimuth angle as the moving direction.

Step S18: the control module 212 determines whether at least one obstacle is detected via the laser range sensing module 202. If detecting any obstacle, the control module 212 performs a step S20. Otherwise, the control module 212 performs a step S22.

Step S20: the control module 212 calibrates the moving direction. Preferably, the control module 212 calibrates the moving direction (such as increasing, decreasing or re-determining the azimuth angle) according to the number of the obstacle(s) for making the calibrated moving direction have an effect on dodging the obstacle(s).

Step S22: the control module 212 controls the mobile robot 2 to move towards the calibrated/uncalibrated moving direction via the driving module 206 according to the calibrated/uncalibrated moving direction. Then, the control module 212 performs the step S12 again for navigating again.

The present disclosed example can effectively prevent the mobile robot from straying into the region without the positioning signal and failure in navigating to the target position via detecting the obstacle actively.

Figure 4:
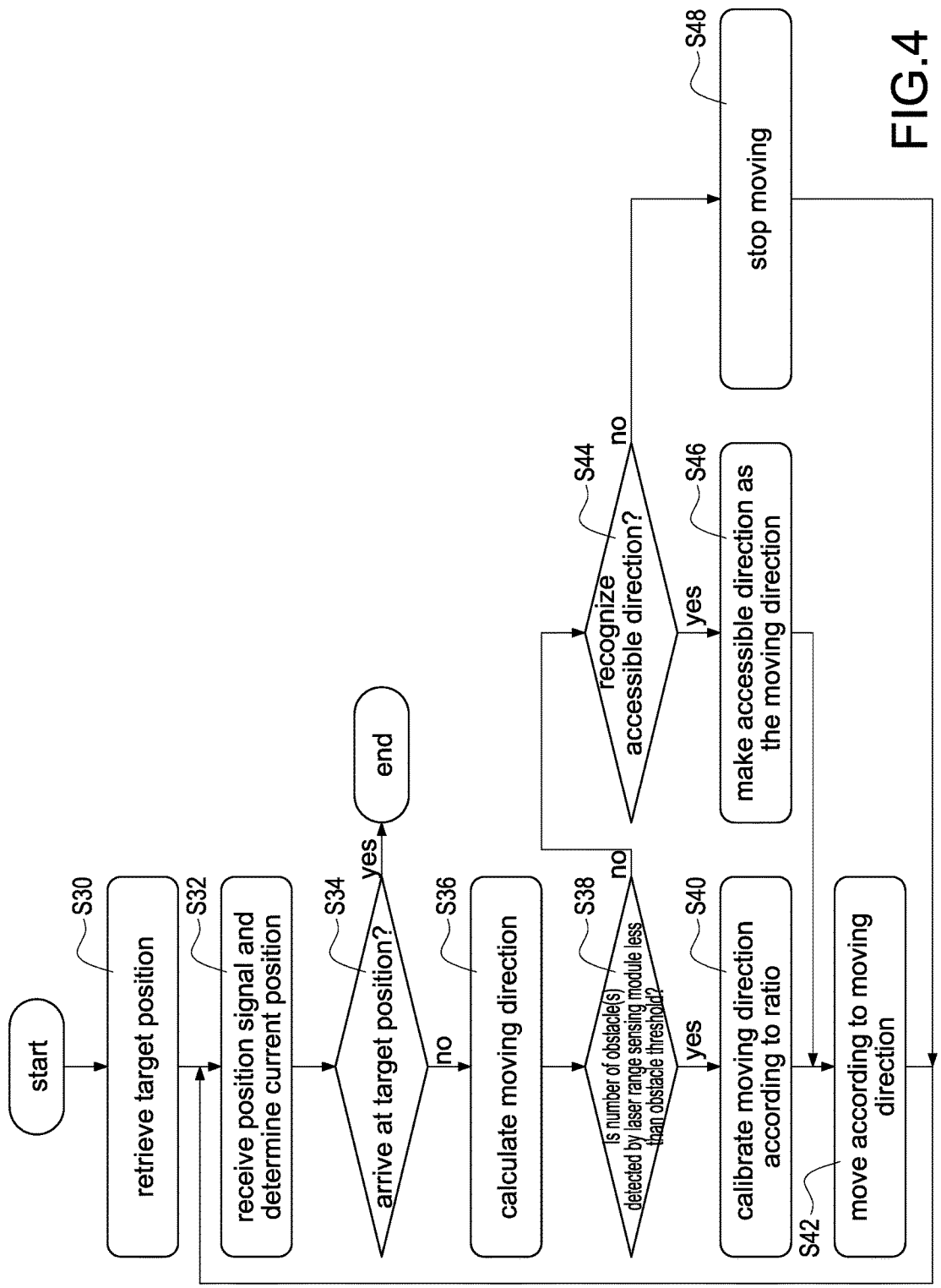
FIG. 4 is a flowchart of a real-time navigating method for mobile robot according to a second embodiment of the present disclosed example.

Please refer to FIG. 4, which illustrates a flowchart of a real-time navigating method for mobile robot according to a second embodiment of the present disclosed example. The real-time navigating method of this embodiment comprises the following steps.

Step S30: the control module 212 retrieves the target position.

Step S32: the control module 212 receives the position signal(s) from outside, and determines the current position.

Step S34: the control module 212 determines whether the mobile robot 2 arrives at the target position.

If determining that the mobile robot 2 doesn't arrive at the target position, the control module 212 performs a step S36. Otherwise, the control module 212 terminates the real-time navigating method.

Step S36: the control module 212 determines the moving direction.

Step S38: the control module 212 detects the number of the obstacle(s), and determines whether the number of the obstacle(s) is less than an obstacle threshold (such as 2).

If determining that the number of the obstacle(s) is less than the obstacle threshold, the control module 212 performs a step S40 and switches to an obstacle-dodging mode.

Preferably, the control module 212 can further detect whether the obstacle(s) locates at an edge of the scan range of the laser range sensing module 202, and performs the step S40 when detecting that the obstacle(s) locates at the edge of the scan range and the number of the obstacle(s) is less than the obstacle threshold. Otherwise, the control module 212 performs the step S44.

Step S40: the control module 212 switches to a calibrating mode, and calibrates the moving direction according to a ratio of the range of the obstacle(s) to the scan range of the laser range sensing module 202.

Preferably, under the calibrating mode, the control module 212 can calibrate the moving direction according to an angle ratio of the range of the obstacle(s) to the scan range of the laser range sensing module 212 and an amplification factor S, wherein the amplification factor S corresponds to an aisle width which the mobile robot 2 locates.

More specifically, the control module 212 uses the following formula 1 to calibrate the moving direction.

$$\delta' = \delta + S \times (\alpha - \alpha_1)/\alpha \qquad \text{(formula 1)}$$

wherein $\delta'$ represents the calibrated moving direction; $\delta$ represents the moving direction before calibrating; S represents the amplification factor; $\alpha$ represents the scan range (in other words, the maximum effective scan angle); $\alpha_1$ represents the angle of the range of the obstacle(s) to the scan range Please be noted that although the control module 212 calculates the calibrated moving direction $\delta'$ according to the amplification factor S in this embodiment, but this specific example is not intended to limit the scope of the disclosed example. In another embodiment of the present disclosed example, the control module 212 can calculate the calibrated moving direction $\delta'$ only using the angle ratio of the range of the obstacle(s) to the scan range without using the amplification factor S.

Step S42: the control module 212 controls the mobile robot 2 to move according to the moving direction.

If the control module 212 determines that the number of the detected obstacle(s) is less than the obstacle threshold in the step S38, the control module 212 performs step S44: the control module 212 under the obstacle-dodging mode determines, via the laser range sensing module 202, whether there is any accessible direction without the obstacle(s) in front.

More specifically, the control module 212 can retrieves the angle which each obstacle locating, and determine whether the gap between the obstacles is large enough (for example, the gap is large than 10 degrees) to allow the mobile robot 2 passing the gap. If determining that there is any gap which allows the mobile robot 2 passing the gap, the control module 212 make the direction corresponding to the determined gap as the accessible direction.

If the control module 212 can recognize any accessible direction, perform a step S46. Otherwise, the control module 212 performs a step S48.

Step S46: the control module 212 make the recognized accessible direction as the new moving direction. Then, the control module 212 performs the step S42 for controlling the mobile robot 2 to move towards the new moving direction.

If the control module 212 fails to recognize any accessible direction in the step S44, perform the step S48: the control module 212 controlling the mobile robot 2 to stop moving.

Preferably, the control module 212 can further send a warning message for notifying the use via the human-machine interface 204 after the mobile robot 2 stops moving.

Preferably, the control module 212 can further control the mobile robot 2 to move backwards so as to increase a probability of recognizing the accessible direction via staying away from the obstacle(s).

Preferably, the control module 212 can switch to a sleep mode for a period of time for waiting the obstacle(s) being excluded.

Via switching to the calibrating mode and the obstacle-dodging mode selectivity, the present disclosed example can effectively calibrate the moving direction for preventing from failure of navigation caused by the error of the positioning signals when the number of the obstacle(s) is less, and actively dodge the obstacle(s) for preventing from colliding with any obstacle when the number of the obstacle(s) is large.

Figure 5:
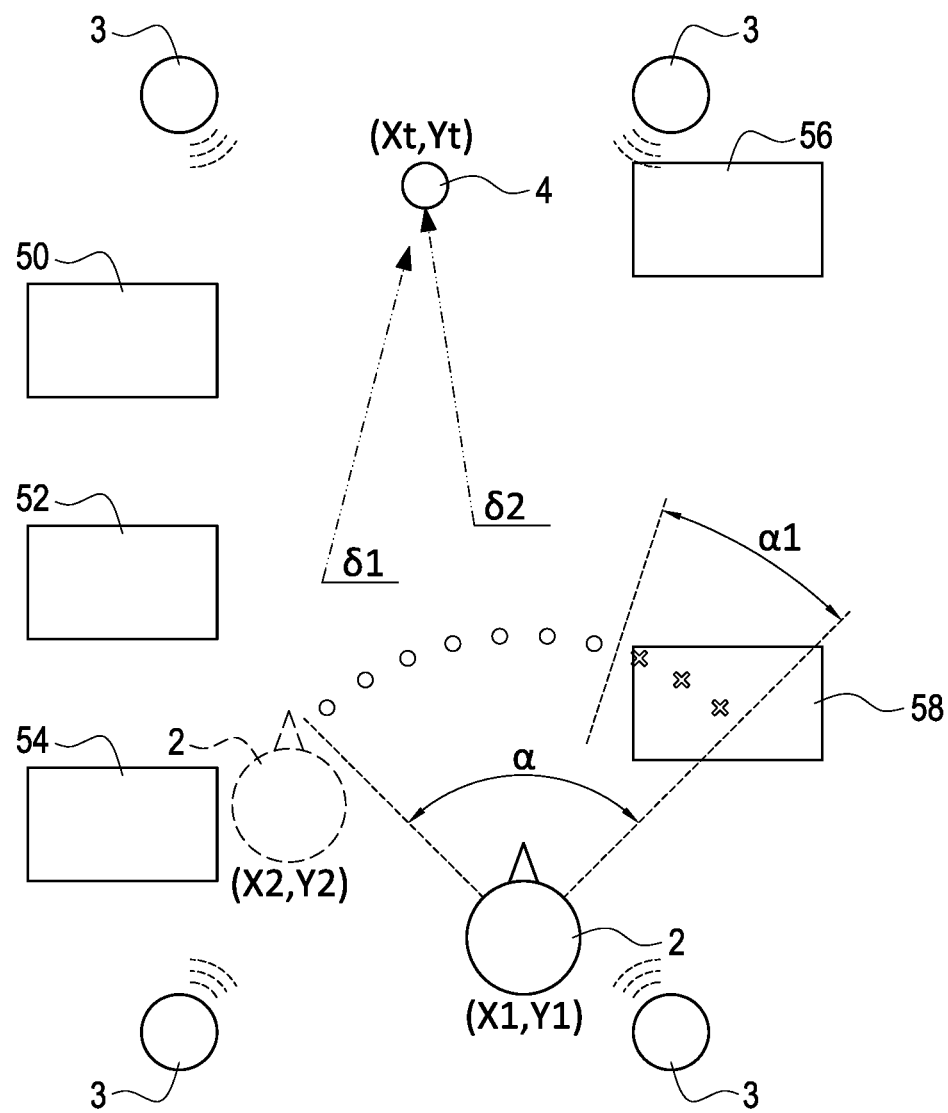
FIG. 5 is a schematic view of a calibrating mode according to the present disclosed example.

Please refer to FIG. 5, which illustrates a schematic view of a calibrating mode according to the present disclosed example for exemplifying the calibrating mode of the present disclosed example. As shown in the figure, the coordinate of the target position 4 is $(X_t, Y_t)$. The mobile robot 2 locates at the main aisle between those shelfs 50-58, and the actual coordinate of the mobile robot 2 is $(X_1, Y_1)$. Additionally, when there is the error in the positioning signal, the mobile robot 2 will incorrectly locate the locating coordinate being $(X_2, Y_2)$, and plan the incorrect moving direction $\delta_1$.

During navigation according to the incorrect moving direction, if the mobile robot 2 actively detects any obstacle (namely the shelf 58) and determines that the detected obstacle locates at the edge of the scan range, the mobile robot 2 can automatically switch to the calibrating mode. Under the calibrating mode, the mobile robot 2 can calculate the ratio of the range of the obstacle (angle $\alpha_{r1}$ in the scan range) to the scan range (maximum scan angle is angle $\alpha$), and calibrate the moving direction according to the calculated ratio, so as to calibrate the incorrect moving direction $\delta_1$ into the correct moving direction $\delta_2$, navigate to the target position $(X_t, Y_t)$ successfully, and prevent from colliding with the obstacle.

Figure 6:
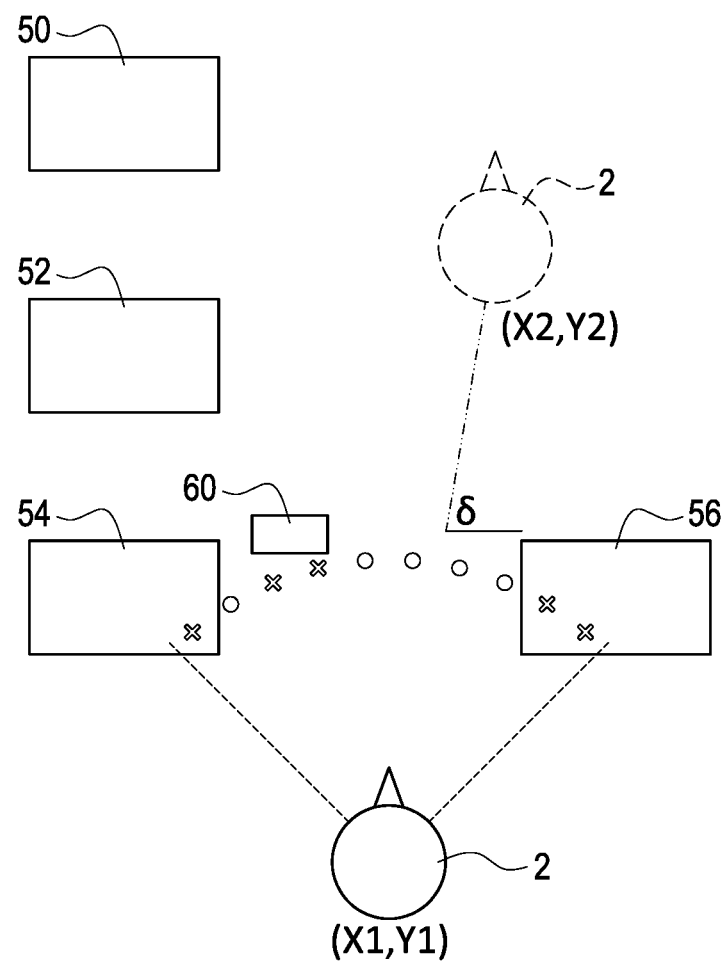
FIG. 6 is a schematic view of an obstacle-dodging mode according to the present disclosed example.

Please refer to FIG. 6, which illustrates a schematic view of an obstacle-dodging mode according to the present disclosed example for exemplifying the obstacle-dodging mode of the present disclosed example. If the mobile robot 2 actively detects any obstacle (such as the fixed shelfs 54, 56 and the movable shelf 60) via the laser range sensing module 202 and determines that the number of the obstacles is not less than the obstacle threshold, the mobile robot 2 switches to the obstacle-dodging mode. Under the obstacle-dodging mode, the mobile robot 2 can recognize the accessible direction $\delta$ from the gap between the shelves 56, 60, and make the accessible direction $\delta$ as the new moving direction. Thus, the mobile robot 2 can move along the recognized accessible direction $\delta$ from the coordinate $(X_1, Y_1)$ to the coordinate $(X_2, Y_2)$, so as to dodge those obstacles.

Figure 7:
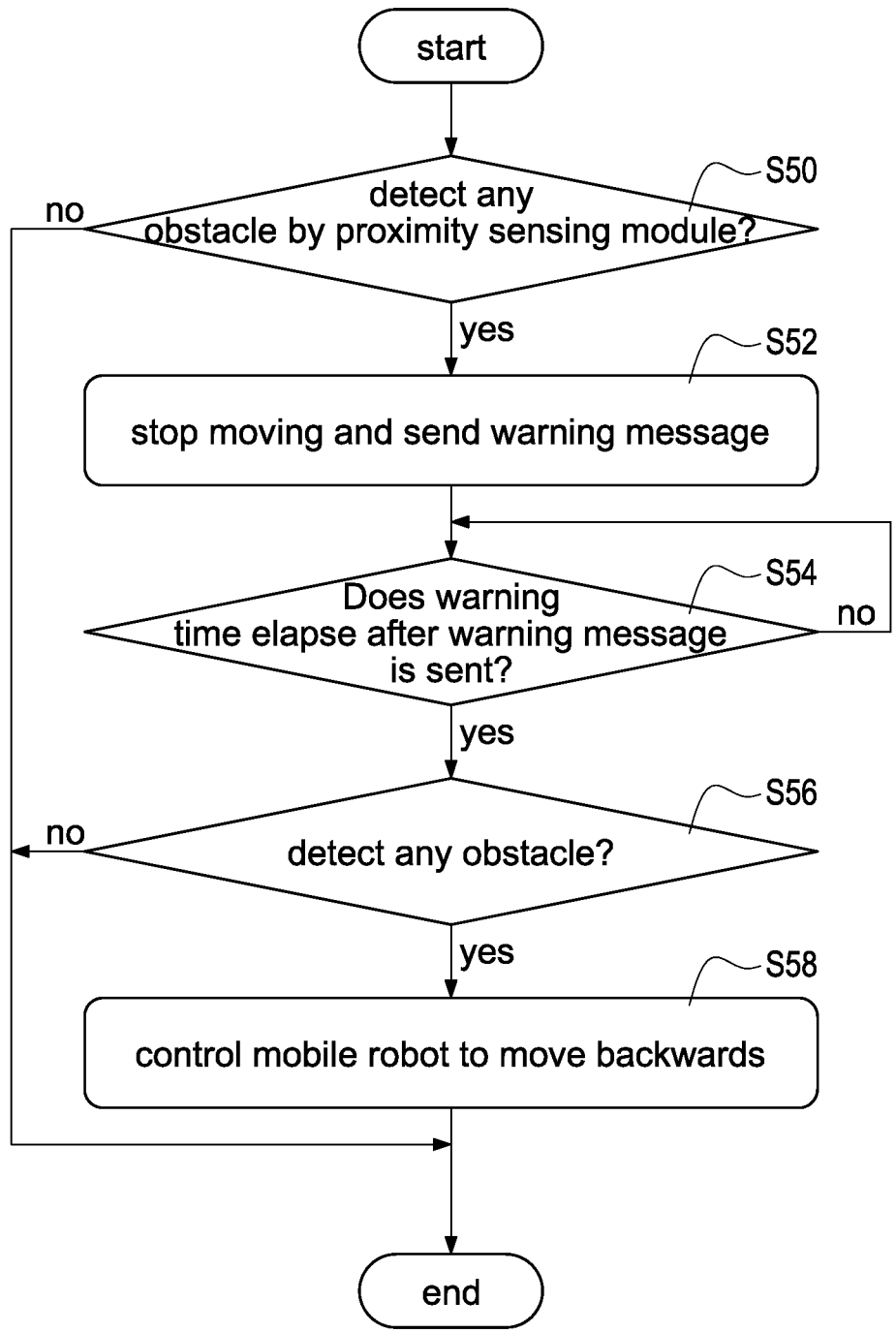
FIG. 7 is a partial flowchart of a real-time navigating method for mobile robot according to a third embodiment of the present disclosed example.

Please refer to FIG. 7, which illustrates a partial flowchart of a real-time navigating method for mobile robot according to a third embodiment of the present disclosed example. In comparison with the first embodiment as shown in FIG. 3, the real-time navigating method for mobile robot of this embodiment further comprises the following steps used to implement a function of dodging the close obstacle(s). Additionally, during above-mentioned navigation, the control module 212 implements the function of dodging the close obstacle(s) continually and repeatedly.

Step S50: the control module 212 determines whether any obstacle is detected via the proximity sensing module 208. If the control module 212 determines that at least one obstacle is detected, performs a step S52. Otherwise the control module 212 terminates this detection.

Step S52: the control module 212 controls the mobile robot 2 to stop moving. Furthermore, the control module 212 can further send the warning message via the human-machine interface 204 (such as sending an audio message "excuse me"), so as to make the obstacle (such as human) actively dodge.

Step S54: the control module 212 determines whether a default warning time (such as 5 seconds) elapses after the warning message is sent. If the control module 212 determines that the default warning time elapses after the warning message is sent, performs a step S56. Otherwise, the control module 212 performs the step S54 again.

Step S56: the control module 212 determines whether any obstacle has been detected currently again. If the control module 212 determines that the obstacle is still there, performs a step S58. Otherwise, the control module 212 terminates this detection.

Step S58: the control module 212 controls the mobile robot 2 to move a default distance backwards for staying away from the obstacle(s). After staying away from the obstacle(s), the mobile robot 2 can perform the real-time navigating method as shown in FIG. 3 or FIG. 4 to actively dodge the obstacle(s).

The present disclosed example can detect the obstacle(s) close to the mobile robot 2 real-time, and prevent from colliding with the obstacle(s). Besides, the present disclosed example can increase the probability of recognizing the accessible direction via moving backwards to stay away from the obstacle(s), so as to effectively increase a probability of dodging the obstacle(s).

Figure 8:
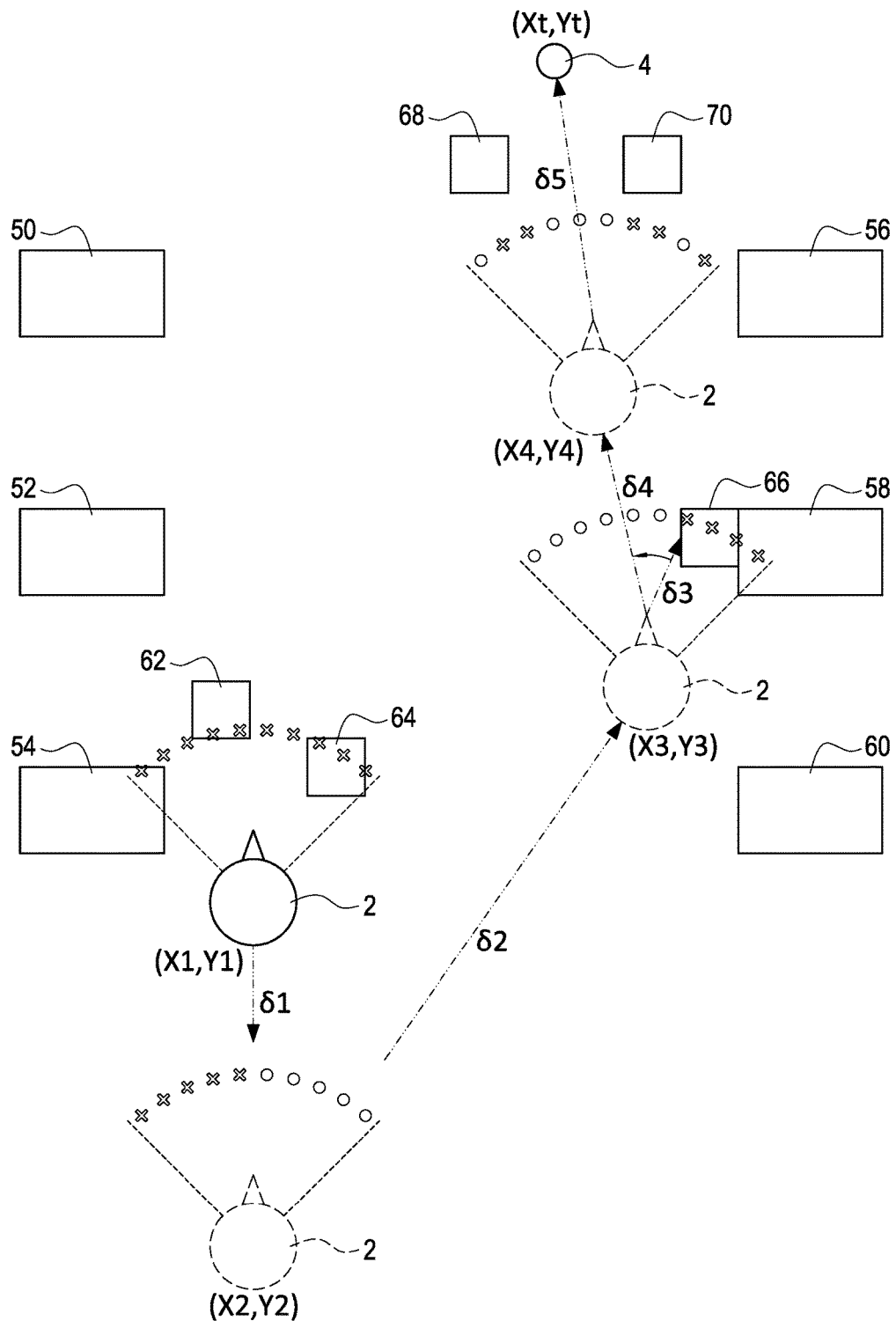
FIG. 8 is a schematic view of automatically navigating of a mobile robot according to the present disclosed example.

Please refer to FIG. 8, which illustrates a schematic view of automatically navigating of a mobile robot according to the present disclosed example. FIG. 8 is used to explain how the mobile robot 2 using the present disclosed example dodges the obstacles continuously by switching to the obstacle-dodging mode and the calibrating mode and completes the navigation. As shown in the figure, the coordinate of the target position is $(X_t, Y_t)$, the mobile robot 2 locates at the main aisle between those shelf 50-60, and the start coordinate of the mobile robot 2 is $(X_1, Y_1)$.

When the mobile robot 2 locates at the coordinate (X1, Y1), the mobile robot 2 can detect those obstacles (namely the shelf 54 and the human 62,64) via the laser range sensing module 202, and switch to the obstacle-dodging mode. Under the obstacle-dodging mode, the mobile robot 2 determines failure in recognizing the accessible direction, and moves towards the moving direction $\delta_1$ to move backwards to the coordinate $(X_2, Y_2)$ for staying away those obstacles. After staying away those obstacles, the mobile robot 2 leaves the obstacle-dodging mode.

Then, the mobile robot 2 at the coordinate $(X2, Y_2)$ detects, via the laser range sensing module 202, that there are a plurality of the obstacles in front, and switches to the obstacle-dodging mode again. Under the obstacle-dodging mode, the mobile robot 2 recognizes that the accessible direction is in right side of the scan range, makes the accessible direction as the moving direction $\delta_2$, and moves towards the moving direction $\delta_2$ to the coordinate $(X_3, Y_3)$ for dodging the obstacles and moving towards the target position 4 for approaching. After this motion, the mobile robot 2 leaves the obstacle-dodging mode.

Then, if the mobile robot 2 at the coordinate $(X_3, Y_3)$ only detects one group of the obstacles (namely the nearby shelf 58 and human 66) via the laser range sensing module 202, and determines that the group of the obstacles locates at the edge of the scan range, the mobile robot 2 switches to the calibrating mode. Under the calibrating mode, the mobile robot 2 calibrates the moving direction $\delta_3$ (calculated according to the positioning signals comprising the error) into the moving direction $\delta_4$, and moves towards the moving direction $\delta_4$ to the coordinate $(X_4, Y_4)$ for compensating the error of the positioning signal and moving towards the target position 4 for approaching. After this motion, the mobile robot 2 leaves the calibrating mode.

Finally, the mobile robot 2 at the coordinate $(X_4, Y_4)$ detects, via the laser range sensing module 202, that there is a plurality of the obstacles (namely the humans 68, 70) in front, and switches to the obstacle-dodging mode again. Under the obstacle-dodging mode, the mobile robot 2 recognizes that there is the accessible direction between those obstacles in the scan range, make the accessible direction as the moving direction $\delta_5$, moves towards the moving direction $\delta_5$ to the coordinate $(X_t, Y_t)$ of the target position 4 for completing this navigation.

Figure 9:
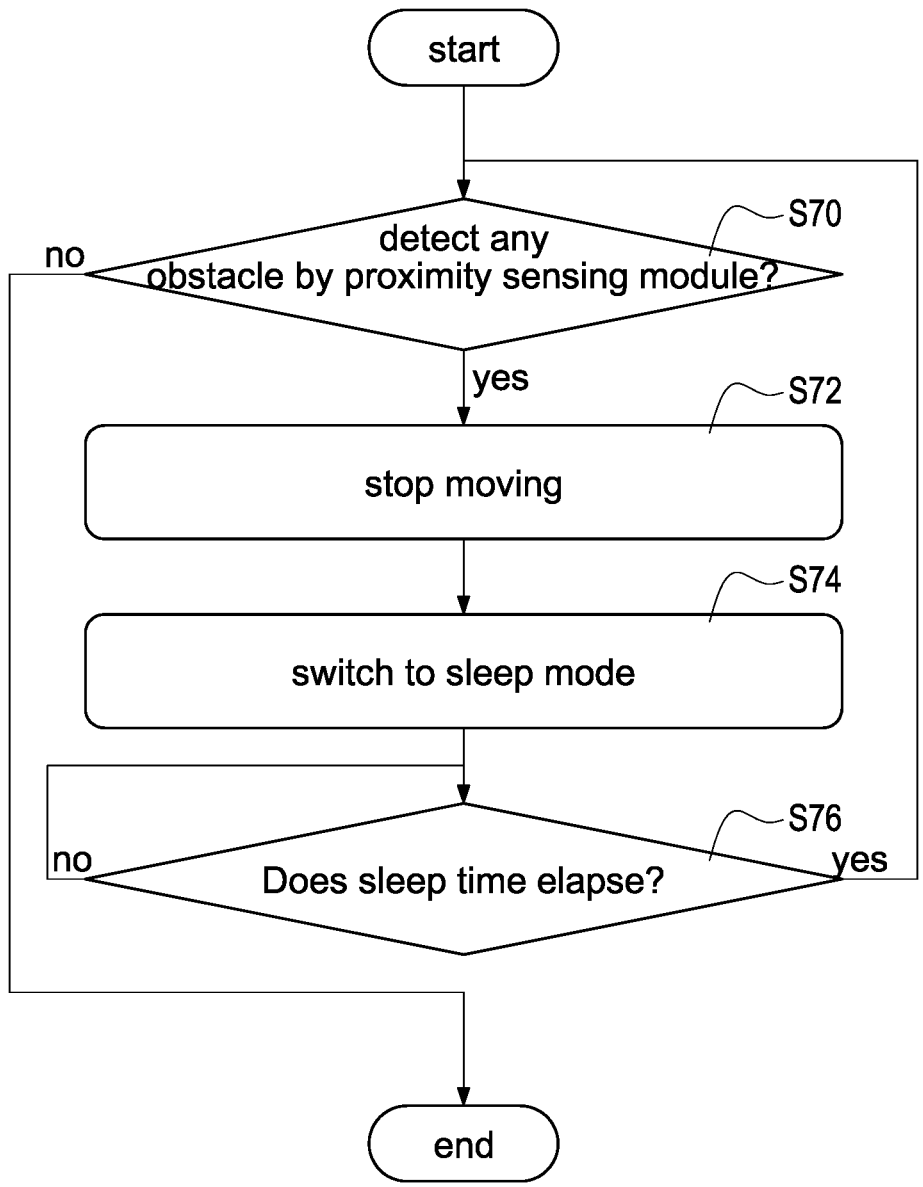
FIG. 9 is a partial flowchart of a real-time navigating method for mobile robot according to a fourth embodiment of the present disclosed example.

Please refer to FIG. 9, which illustrates a partial flowchart of a real-time navigating method for mobile robot according to a fourth embodiment of the present disclosed example. In comparison with the first embodiment shown in FIG. 3, the real-time navigating method of this embodiment further comprises the following steps used to implement a function of waiting for excluding the obstacle(s). Besides, during navigation, the control module 212 implements the function of waiting for excluding the obstacle(s) continually and repeatedly.

Step S70: the control module 212 determines whether any obstacle is detected via the proximity sensing module 208.

If the control module 212 determines that any obstacle is detected, performs the step S72. Otherwise, the control module 212 terminates this detection. Additionally, after terminating the detection, the mobile robot 2 can move towards the target position continuously via performing the real-time navigating method as shown in FIG. 3 or FIG. 4 for approaching.

Step S72: the control module 212 controls the mobile robot 2 to stop moving.

Step S74: the control module 212 controls the mobile robot 2 to switch to the sleep mode. More specifically, under the sleep mode, the mobile robot 2 can reduce the power consumption. Preferably, the control module 212 switches to the sleep mode after the mobile robot 2 stops moving for the default sleep mode enabling time (such as 30 seconds).

Step S76: the control module 212 determines whether a default sleep time (such as 30 seconds) elapses after the mobile robot 2 is switched to the sleep mode. If the control module 212 determines that the default sleep time has elapsed, performs the step S70 again for detecting whether the obstacle having been excluded. Otherwise, the control module 212 performs the step S76 again.

The present disclosed example can detect the close obstacle(s) real-time, and prevent from colliding with the obstacle(s). Besides, the present disclosed example can effective reduce the power consumption when waiting for excluding the obstacle(s), so as to effective increase the endurance.

The above mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. A real-time navigating method for mobile robot, the method comprising:
  a) retrieving a target position at a mobile robot;
  b) determining a current position of the mobile robot according to a position signal received by an ultra-wideband communication module;
  c) calculating a moving direction according to the target position and the current position;
  d) calibrating the moving direction when detecting any obstacle by a laser range sensing module, and controlling the mobile robot to move towards the calibrated moving direction; and
  e) repeatedly executing the step b to the step d until the mobile robot arrives the target position.

2. The real-time navigating method for mobile robot according to claim 1, wherein the step d comprises a step d1: calibrating the moving direction according to a ratio of a range of the obstacle to a scan range of the laser range sensing module when a number of the detected obstacle is less than an obstacle threshold.

3. The real-time navigating method for mobile robot according to claim 2, wherein the step 1 is to calibrate the moving direction according to the ratio of the range of the obstacle to the scan range of the laser range sensing module when the number of the detected obstacle is less than 2 and the obstacle locates at an edge of the scan range.

4. The real-time navigating method for mobile robot according to claim 2, wherein the step d1 is to calibrate the moving direction according to an angle ratio of the range of the obstacle to the scan range of the laser range sensing module and an amplification factor, the amplification factor corresponds to an aisle width which the mobile robot locates.

5. The real-time navigating method for mobile robot according to claim 1, wherein the step d comprises a step d2: recognizing an accessible direction without the obstacles in front when the number of the obstacles is not less than an obstacle threshold, and making the accessible direction as the new moving direction.

6. The real-time navigating method for mobile robot according to claim 5, wherein the step d further comprises a step d3: controlling the mobile robot to stop moving when failing to recognize the accessible direction in a scan range of the laser range sensing module.

7. The real-time navigating method for mobile robot according to claim 1, further comprising a step f: controlling the mobile robot to stop moving when detecting the obstacle by a proximity sensing module.

8. The real-time navigating method for mobile robot according to claim 7, further comprising a step g after the step f: sending a warning message when the mobile robot stops moving.

9. The real-time navigating method for mobile robot according to claim 8, further comprising a step h after the step g: controlling the mobile robot to move backwards when a warning time elapses after the warning message is sent and still detecting the obstacles by the proximity sensing module.

10. The real-time navigating method for mobile robot according to claim 7, wherein further comprising the following steps after the step f:
   i) controlling the mobile robot to switch to a sleep mode when stopping moving for a stop time and detecting the obstacles by the proximity sensing module; and
   j) re-recognizing the accessible direction in the scan range of the laser range sensing module when switching to the sleep mode for a sleep time.

* * * * *